United States Patent [19]
Barclay et al.

[11] Patent Number: 5,960,399
[45] Date of Patent: Sep. 28, 1999

[54] CLIENT/SERVER SPEECH PROCESSOR/RECOGNIZER

[75] Inventors: Christopher B. Barclay, Brookline; Richard M. Schwartz, Sudbury; David G. Stallard, Cambridge; Lawrence R. Smith, Boxborough, all of Mass.

[73] Assignee: GTE Internetworking Incorporated, Cambridge, Mass.

[21] Appl. No.: 08/997,912

[22] Filed: Dec. 24, 1997

Related U.S. Application Data

[60] Provisional application No. 60/034,360, Dec. 24, 1996.

[51] Int. Cl.$^6$ ....................................................... G10L 9/06
[52] U.S. Cl. .......................... 704/270; 704/233; 704/275; 704/243; 704/251; 707/10; 370/349
[58] Field of Search ................................... 704/233, 243, 704/251, 253, 270, 200, 275, 235, 241; 707/10; 370/349; 395/12

[56] References Cited

U.S. PATENT DOCUMENTS

| | | | |
|---|---|---|---|
| 3,812,291 | 5/1974 | Brodes et al. | 704/253 |
| 4,991,217 | 2/1991 | Garrett et al. | 704/235 |
| 5,231,670 | 7/1993 | Goldhor et al. | 704/275 |
| 5,271,088 | 12/1993 | Bahler | 704/200 |
| 5,333,237 | 7/1994 | Stefanopoulos et al. | 395/12 |
| 5,475,792 | 12/1995 | Stanford et al. | 704/233 |
| 5,513,298 | 4/1996 | Stanford et al. | 704/243 |
| 5,583,961 | 12/1996 | Pawlewski et al. | 704/241 |
| 5,699,486 | 12/1997 | Tullis et al. | 704/270 |
| 5,726,984 | 3/1998 | Kubler et al. | 370/349 |
| 5,732,187 | 3/1998 | Scruggs et al. | 704/251 |
| 5,745,754 | 4/1998 | Lagarde et al. | 395/615 |
| 5,752,232 | 5/1998 | Basore et al. | 704/275 |
| 5,752,246 | 5/1998 | Rogers et al. | 707/10 |

Primary Examiner—David R. Hudspeth
Assistant Examiner—Vijay B. Chawan
Attorney, Agent, or Firm—Leonard C. Suchyta

[57] ABSTRACT

A real-time or streaming speech processing system and method is disclosed with capabilities distributed between and client and a server where the server may be reached via the Internet. The speech processing entails digitizing and converting the utterances to features extracted to help the processing. The features are sent via a communications channel to the server where the recognition occurs. The features extracted allow low bandwidth channels to be used with still maintaining real-time response. The recognizer will determine the most likely text representing the utterances and return the text to the client. The system can be used to identify and/or verify who is speaking.

16 Claims, 7 Drawing Sheets

CLIENT/SERVER SPEECH PROCESSOR/RECOGNIZER

RELATED APPLICATIONS

Priority is claimed under 35 U.S.C. § 119 (e) for the present invention from a Provisional Application Ser. No. 60/034,360 filed on Dec. 24, 1996 of the same subject matter and inventors as the present application.

FIELD OF INVENTION

This invention relates to the general field of speech processing methods and apparatus adapted to a client/server architecture. Herein speech processing is defined as speech recognition, speaker identification, speaker verification, and the like.

BACKGROUND OF INVENTION

Speech processing for recognition, speaker identification and speaker verifications and/or other such decoding h as been greatly improved and now accurate techniques are well known in the art. The following several papers discuss the various speech processing referenced above and provide a representation of the state of this art:

1) A paper entitled, "State of the Art in Continuous Speech Recognition," was published in the Proceedings of the National Academy of Science, USA, Vol. 92, pp. 9956–9963, Oct. 1995, authored by John Makhoul and Richard Schwartz. This paper is hereby incorporated by reference herein as if laid out in full.
2) A paper entitled, "Speaker Verification IR&D Final Report," was prepared by BBN Laboratories Inc., in Nov. 1987 and authored by Richard Schwartz, Alan Derr, Alexander Wilgus and John Makhoul. This paper is hereby incorporated by reference herein as if laid out in full.
3) A paper entitled, "Identification of Speakers engaged in Dialog," published in the IEEE International Conference on Acoustics, Speech, and Signal Processing, held in Minneapolis, Minn., on Apr. 27–30 of 1993. This paper is hereby incorporated by reference herein as if laid out in full.
4) A paper entitled, "A Tutorial of Hidden Markov Models and Selected Applications in Speech Recognition," published by the IEEE in 1989 by Lawrence Rabiner. The IEEE log number is 8825949. This paper is hereby incorporated by reference herein as if laid out in full.

The Makhoul and Schwartz paper (item 1 above) provides a good basis for understanding the technical aspects that underlie the present invention, a brief review of this paper follows. The authors wrote the paper under the auspices of BBN Systems and Technology, Cambridge Mass., the same assignee of the present patent. The paper discloses three major factors in speech recognition, linguistic variability, speaker variability and channel variability. Channel variability includes the effects of background noise and the transmission apparatus, e.g. microphone, telephone, echoes, etc. The paper discusses the modeling of linguistic and speaker variations. An approach to speech recognition is to use a model, a logical finite-state machine where transitions and outputs are probabilistic, to represent each of the groups of three (or two) phonemes found in speech. The models may have the same structure but the parameters in the models are given different values. In each model there is a hidden Markov model (HMM). HMM is a statistical artifact that is well discussed in the above paper and the references listed therein, and is not be described in depth herein. FIG. 5 of the paper describes an approach to speech recognition. The system is trained by actual speakers articulating words continuously. The audio signal is processed and features are extracted. The signal is often smoothed by filtering by hardware or by software (if digitized and stored), followed by mathematical operations on the resulting signal to form features which are computed periodically, say every 10 milliseconds or so. Continuous speech is marked by sounds or phonemes that are connected to each other. The two adjacent phonemes on either side of a given phoneme have a major effect, referred to as co-articulation, on the articulation of the center phonemes. Triphoneme is the name given to the different articulation of a given phoneme due to the affects of these side phonemes. The continuous speech is divided into discrete transformed segments that facilitate the several mathematical operations. Many types of features have been used including, time and frequency masking, taking of inverse Fourier transforms resulting in a mathematical series of which the coefficients are retained as a feature vector. The features are handled mathematically as vectors to simplify the training and recognition computations. Other features may include volume, frequency range, and amplitude dynamic range. Such use of vectors is well known in the art, and reference is found the Makhoul and Schwartz paper on page 9959 et seq. The spoken words used in the training are listed in a lexicon and a phonetic spelling of each word is formed and stored. Phonetic word models using HMM's are formed from the lexicon and the phonetic spellings. These HMM word models are iteratively compared to the training speech to maximized the likelihood that the training speech was produced by these HMM word models. The iterative comparing is produced by the Baum-Welch algorithm which is guaranteed to converge to form a local optimum. This algorithm is well known in the art as referenced in the Makhoul and Schwartz paper on page 9960. A grammar is established and with the lexicon a single probabilistic grammar for the sequences of phonemes is formed. The result of the recognition training is that a particular sequence of words will corresponds with a high probability to a recognized sequence of phonemes. Recognition of an unknown speech begins with extracting the features as in the training stage. All word HMM model sequences allowed by the grammar are searched to find the word (and therefore the triphoneme) sequence with the highest probability of generating that particular sequence of feature vectors. Prior art improvements have included development of large databases with large vocabularies of speaker independent continuous speech for testing and development. Contextual phonetic models have been developed, and improved recognition algorithms have been and are being developed. Probability estimation techniques have been developed and language models are being improved. In addition, computers with increased speed and power combined with larger, faster memories have improved real time speech recognition. It has been found that increased training data reduces recognition errors, and tailored speaker dependent training can produce very low error rates.

There are examples of speech recognition applications applied to the Internet. One such example is IBM's Merlin speech recognition system. Merlin interfaces with the NETSCAPE NAVIGATOR®, web-browse so that text generated from speech by Merlin is available to others via the Internet. A limitation of this system is that the grammar, vocabulary and recognizer are all resident on the client's computer. In the case of a client running on a laptop or other such small computer the speech recognition may be quite limited. Another issue with the set up of Merlin and other recognition systems resident at the client is that all updates and other changes must be made to each client and there may be literally millions of such clients. Even though updates and the like could be made available over the Internet, it remains an inconvenience.

Texas Instruments offers an Internet based speech recognition system called SAM which requires the speech recognizer software to reside at the client. SAM is a Mosaic browser which has been modified to include a speech recognizer. However, the grammar is, in effect distributed and down loaded when a Web page for specific topics is entered, called a "smart page." For example, a weather report page could have a grammar specific to words and phrases associated with the weather. An example would be a grammar that recognizes such utterances as "Show me the weather for Boston," yielding a weather report for Boston. An artifact of such a system is that the vocabularies and grammars are small and the system cannot accommodate large vocabularies and grammars associated with speech recognition in general. Vocabularies and grammars for such general systems are large, in the order of 150 MBytes which are too large to down load at run time. SAM re-acquires that the user's browser be replaced by one modified to contain a Web browser.

Another limitation of systems where the speech recognition resides at the client is that the arrangement is not conducive to speaker identification and/or verification. Since the speech recognition is at the client, the identity and verification is not likely to be secure. If the speech recognition is at a single server location that one location serving many clients can be made secure.

Another Internet-based speech recognition system (SLAM) was developed by the Oregon Graduate Institute (OGI). This system sends compressed digitized speech over the Internet to a remote server where a recognizer resides. In this system the speech is entirely received before beginning the recognition process. SLAM retains the speech at the client which serves the purpose of allowing better speech compression and relieves the recognizer from having to determine some over-head-like functions such as the end-of-speech. But, as a result the speech recognition cannot function in real-time. The speech compression of SLAM is data compression where communication bandwidth is reduced from sending raw digitized speech, but there remains a bandwidth limitation using SLAM where excessive time delays may occur between the speech and the delivered text.

Also, SLAM does not mention or refer to speaker identification nor to speaker verification.

It is an object of the present invention to provide a speech processing system distributed between a client and a server operating in a "streaming" or real-time continuous mode. A related object is to provide real-time speech processor distributed over a network, e.g. the Internet.

It is another object of the present invention to provide a speech processing system useful with low bandwidth communications channels and where the client computer is a laptop or other such computer with limited memory and/or speed.

Another object of the present invention is to provide control information between the client and the server over a communications link that directs and augments the speech processing.

SUMMARY OF THE INVENTION

The objects set forth above as well as further and other objects and advantages of the present invention are achieved by the embodiments of the invention described herein below.

The invention is a real time speech processing method and system. Utterances are digitized and input into a client computer system as the utterances occur. Features are extracted and quantized and sent to a server computing system. The server processes the features and sends a response back to said client computing system. The response may be the text of the recognized speech in one preferred embodiment, or a filled out form in another preferred embodiment.

An advantage of the present invention is that large vocabularies and grammars can be used to process speech in real time with the client computer being a laptop of other hardware of limited memory and/or computing power while using low bandwidth communication channels. A related advantage is that less data needs to be communicated between the client and the server.

Since the recognizer vocabulary grammar resides at the server, the present invention can work with large and small recognition systems and with other non-recognition applications, such as speaker identification and verification, with equal ease.

The invention also provides for sending control information to the remote server allowing the server to activate other applications. For example, control information may be sent that activates the server to use the recognized speech to fill out and file forms, reservations, or activate a natural language recognizer, or other such specialized application tasks.

Another advantage is that changes or updates need only be made at the server location not at every user.

Other objects, features and advantages will be apparent from the following detailed description of preferred embodiments thereof taken in conjunction with the accompanying drawings in which:

DETAILED DESCRIPTION OF PREFERRED EMBODIMENTS

Figure 1:
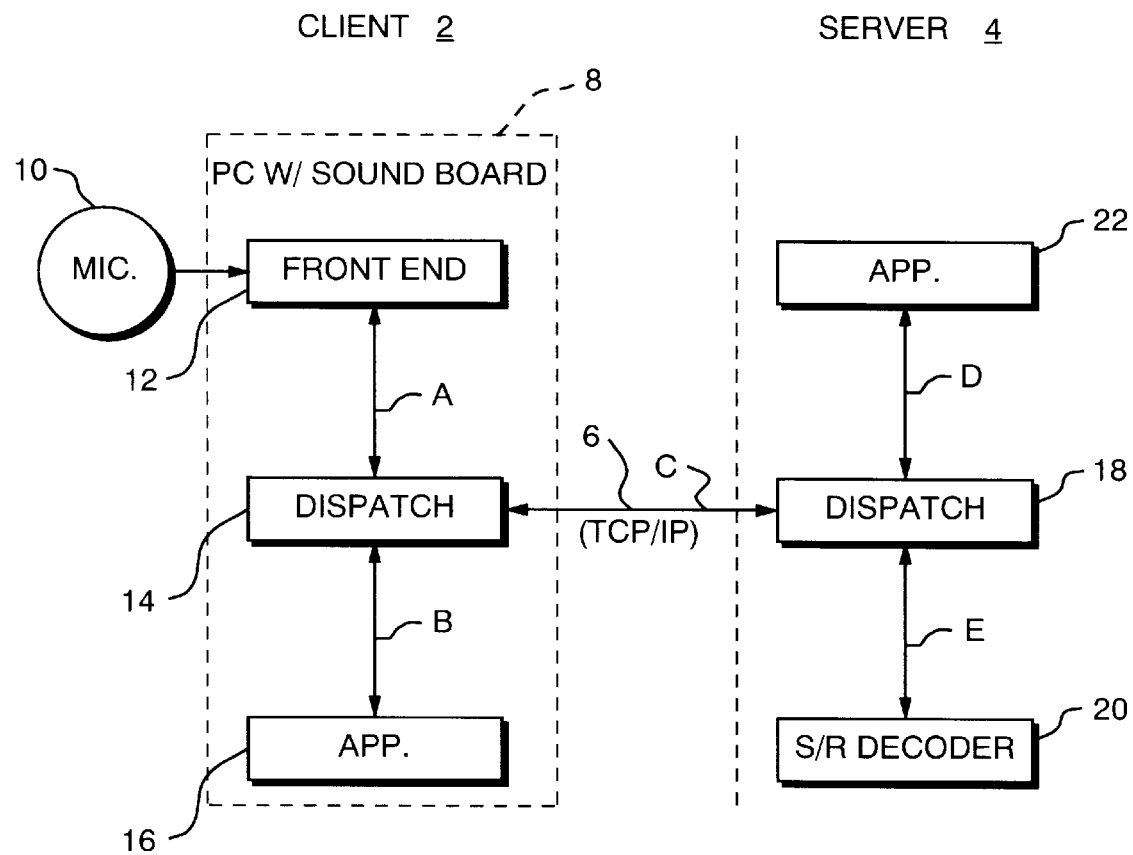
FIG. 1 is a functional software block diagram of the inventive overall system.

FIG. 1 shows a preferred embodiment of the present invention with the client system 2 on the left and the server system on the right 4. A TCP/IP communication channel, which represents a communication protocol and corresponding hardware, joins the client to the server in this preferred embodiment. It is to be understood that connection between the client and the server can be any communications channel including the Internet or any intranet or the like. On the client side a personal computer (PC) with a sound board 8 which provides the analog to digital conversion (ADC) needed to convert the sound into a digital representation. A microphone 10 accepts the audio input and outputs an analog signal (a voltage or a current) to the ADC. The front-end 12 is a program for collecting the digitized speech and extracts a set of features, called cepstra, in the art. The features are those features that provide the best recognition or speaker identification and/or verification as determined and as known in the art as represented in the above incorporated by reference papers. The front-end 12 also quantizes those features, as is known in the art, for transmission to the server 4. The Rabiner paper, item 4 above, discusses the operation of such a front-end.

Still referring to FIG. 1, an application program 16 controls the front-end and the dispatcher 14 for collection, quantitization, and dispatching of the extracted features to the remote server. In a preferred embodiment this application program 16 is a web-browser. The transfer of information between the programs 12, 14 and 16 may be organized in conformance with the TCP/IP protocols but the data may be transferred by other common techniques, e.g. parallel bus, other serial ports, IEEE bus, even a SCUSI bus, and the like.

Still referring to FIG. 1, the server side 4 may be any large or distributed computing system with suitable capabilities for performing the tasks required. In preferred embodiments the server can operate on a PC, a main frame, or any of the work stations. The hardware and physical connections are known in the art. There are, in this preferred embodiment, at least three program modules: a dispatcher 18 that physically receives the quantized features, a speech recognizer/decoder 20 and an application program that controls the other two programs 18 and 20. The speech recognizer may be designed following the Makhoul/Schwartz paper referenced above. But, other speaker identification and/or speaker verification programs that may be designed according to the references cited above.

Figure 2A:
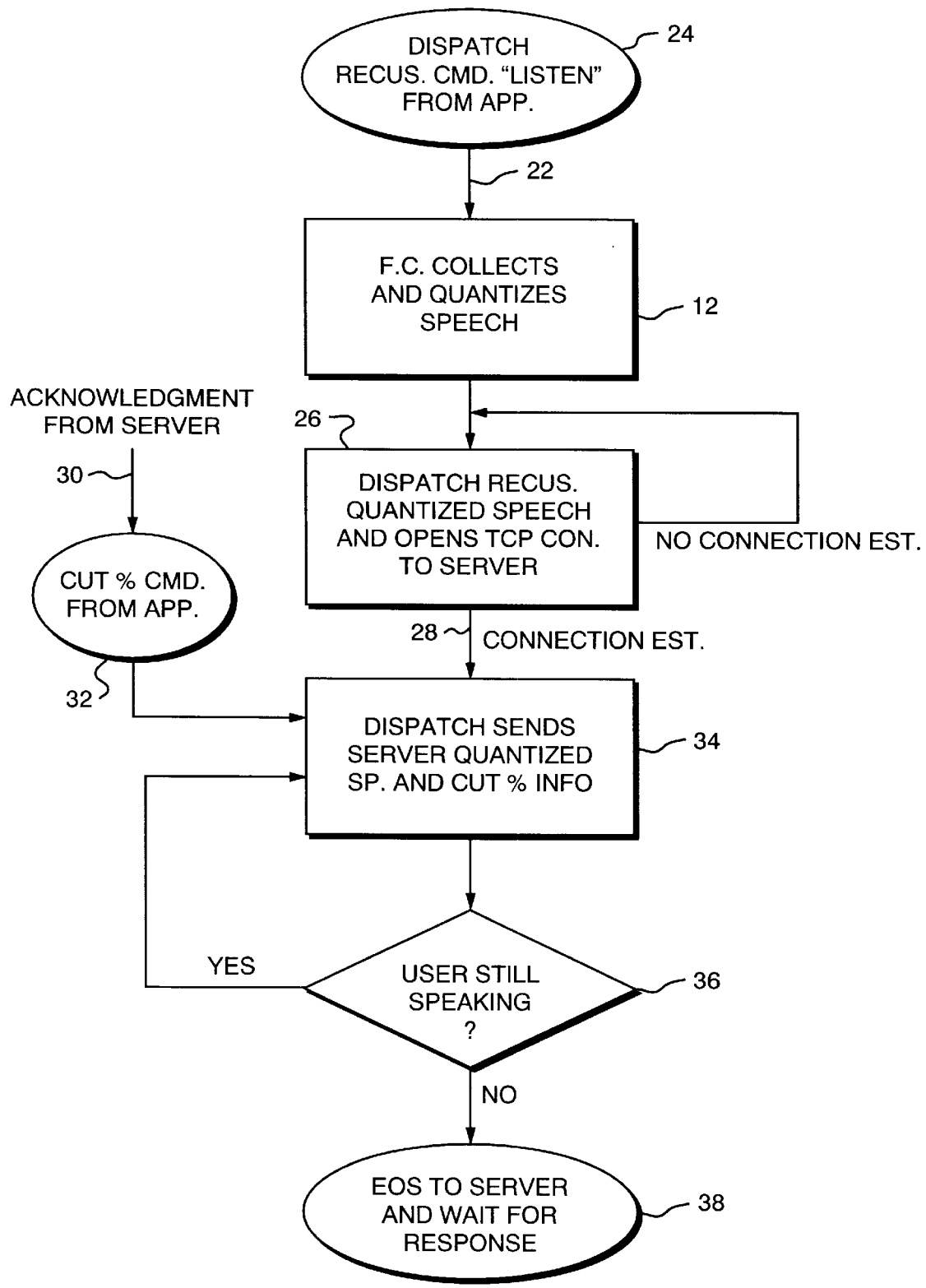
FIG. 2A is a block diagram/flow chart of the operations of the client computing system.

FIG. 2A shows more detail of the client side of FIG. 1. The front end program 12 is commanded to LISTEN 22 by the application program 24. The application program also commands the dispatcher to be ready to receive and buffer information from the front end and to open a communications channel to the server 26. When opened 28 a message may be sent to the server that quantized speech information is about to be sent. Control information 34 may be sent at this time. For example, if speaker identification is desired such a command may be sent to prepare the server to activate the corresponding program. The front end digitizes, collects and derives and quantizes features from the raw digitized information data. The quantized feature data is delivered to the dispatcher 26 where it may be temporarily buffered. Such buffering does not detract from the real-time aspect of the present invention since the buffering is to accommodate timing delays and synchronization that may be needed, e.g. to allow the communication channels to be opened. As the speech is processed the dispatcher buffers the quantized speech data. When an acknowledgment 30 is sent from the server that it is ready to receive information, the dispatcher receives a command 32 from the application and begins sending 34 the quantized speech data. At this time the server may not have yet established communications with the speech processor. In this manner time is saved that helps the system provide a response in real time. The front end detects the end-of-speech (EOS) 36, as described in the above itemized references, which is sent to the dispatcher where it is encoded and sent to the server 38.

Figure 2B:
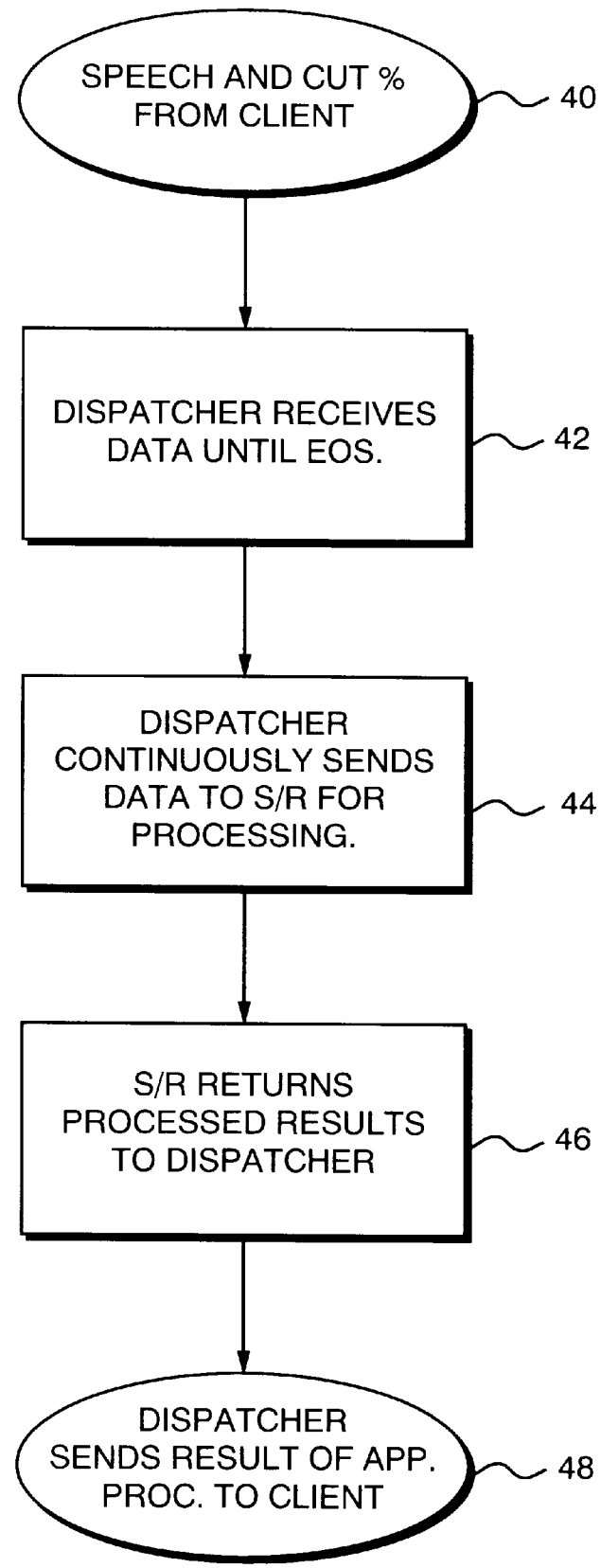
FIG. 2B is a functional block diagram/flow chart of the operations of the Dispatcher or Server.

FIG. 2B shows more detail of the server. Control information and/or quantized speech data is receiver 40 by the server computer system via a communications link. The data is received 42 by the dispatcher (18 in FIG. 1) software at the server until the EOS signal is received by the dispatcher. The dispatcher sends 44 the data continuously to the speech recognizer or other such identification/verification or other such program where the processing is performed continuously. If the speech processor is a speech recognizer as in FIG. 2A the most likely transcription or text is determined until an EOS is received. At this point the transcription is returned 46 to the dispatcher and, under the control of the application program, the dispatcher returns the text to the client 48. The results may be the text most likely spoken or who is speaking or other such results form other programs that analyze speech. The dispatcher, speech processor and sending back the processed data is controlled by an application (22 of FIG. 1) program. However, the application program may be more than a controller in a preferred embodiment. The client may require special functions be performed that are different or in addition to simply returning the transcribed text from a speech recognizer. For example, if the transcribed text was to be used as a guide into a natural language database for better understanding, the application program receives and understands the request from the client as part of an above mentioned control message and performs the desired function with the database.

In FIGS. 1, 2A and 2B the programs at the client and the server are shown as if in one computing system. However, the different software modules in the client of the server could be resident in several different computing systems connected by fast communication links. For example, the dispatcher and the front end of the client or the dispatcher and the speech processor of the server could be in different computing systems connected by an Ethernet cable.

Figure 3:
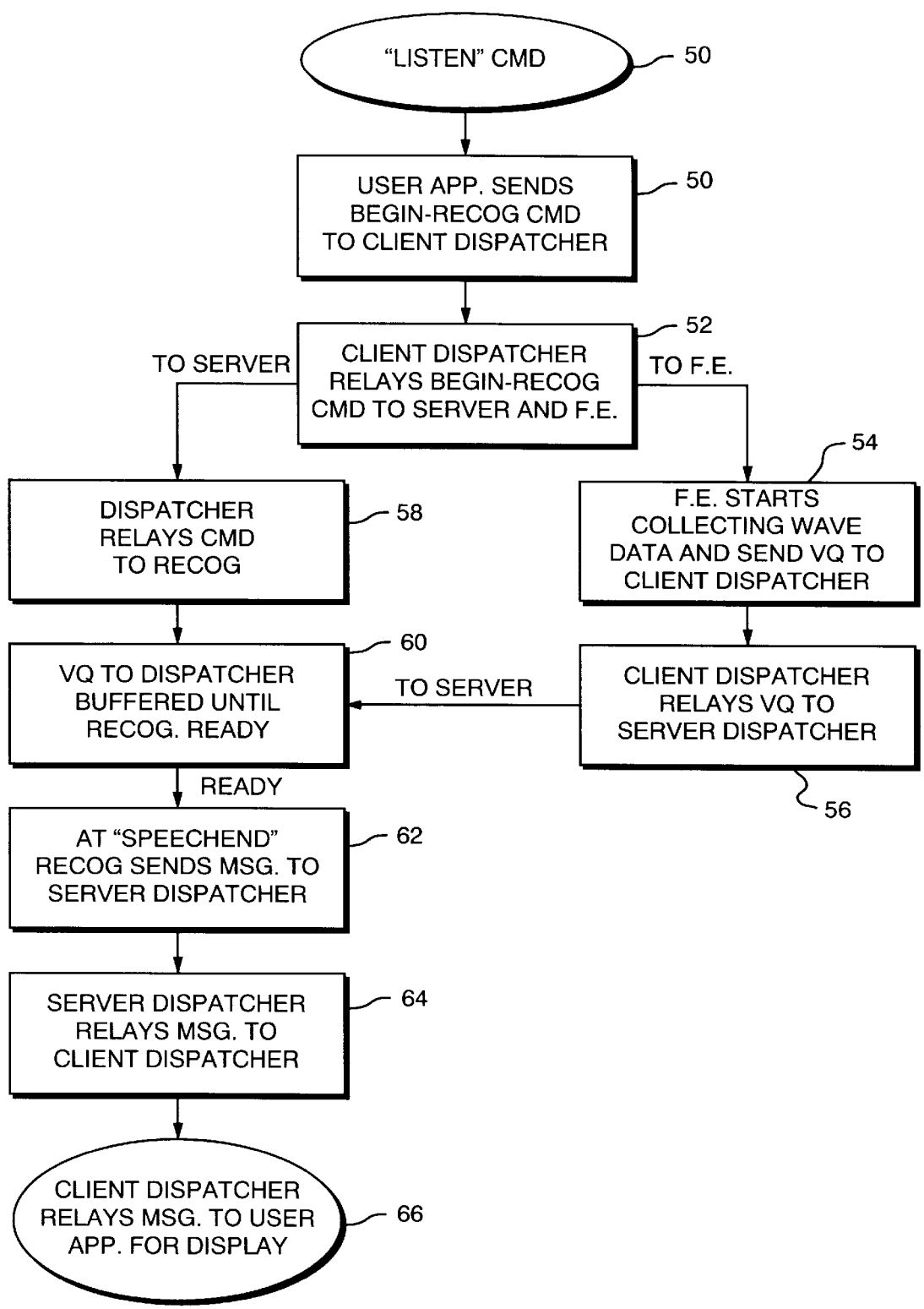
FIG. 3 is a functional block diagram/flow chart of micro-domain search.

FIG. 3 shows more detail of a dispatcher program at the client and/or the server in a preferred embodiment. The dispatcher is required because of the technical challenges introduced by speech processing over the Internet. If the client and the server communicate over the Internet which is a widely used complex network topography that introduces problems not usually found where the client and the server are interconnected by fast networks, like Ethernet. The problems include unpredictable latencies times of large magnitudes, lower predictability about the presence and the behavior of the Internet connected software and hardware modules, and lessening of overall control. The dispatcher software module logically sends and receives the quantized speech data direct to and from the Internet. The dispatcher provides data buffering, data flow control and sequencing of communications with and between the application control program and the speech processing programs and/or the front end programs. The dispatcher is designed to implement and function, as is known in the art with the TCP/IP communication hardware and protocols. The dispatcher minimizes delays over the Internet by sending and receiving the information as fast as the Internet and the receiver can accept it. The dispatcher does not wait for completion of logical blocks and the dispatcher itself is designed to quickly service the Internet with minimum overhead time in such servicing. In this preferred embodiment the dispatcher is specifically designed to cooperate efficiently with the front end, the speech recognition, and the application control programs. All such design particulars and technical individual electronics are well known in the field allowing a design of the dispatcher by those skilled in the art from the general parameters and objectives herein described.

Still referring to FIG. 3, where the dispatcher at the client is described in detail, the user starts the processing at the client (could be at the server) computer system by means known in the art, e.g. sending via a communications port, clicking on an icon, typing on a keyboard or keypad, or by pressing the appropriate button on a control interfaced to the system. The following description is in a pseudo-code like format where the software and hardware means are well known in the art and not specifically detailed herein. The application program receives the listen command by issuing a start command and issues a LISTEN command 50 to the application program. The application sends a BEGIN/RECOGNITION command 52 to the dispatcher which signals the server via the Internet that data is coming for recognition 58 and directs the front end to start collecting and digitizing the raw audio signal. The front end 54 begins to collect analog audio signal data, to digitize that audio data, to extract features, to quantize those feature 56, and to stream the quantized data to the dispatcher. "Stream" is defined as to send substantially continuously the data in real-time. The data in process may be buffered within the dispatcher temporarily until processed. The features are returned 56 to the client dispatcher for sending to the server. The set of features are the features discussed in the above referenced papers. When a period of silence is encountered an end-of-speech signal is generated. The quantized feature data is sent to the server dispatcher 60 which may buffer that data until the speech recognizer is ready to accept that data.

Still referring to FIG. 3, when the begin recognition is received by the server, the server relays 58 that command to the speech recognizer. The server dispatcher accepts and buffers messages (digitized quantized features) 60 before the recognizer is ready to receive and process the messages. This is to reduce the latency time. The recognizer becomes ready to receive and process the speech 62 at which time the server dispatcher send the message data to the recognizer. When an end-of-speech is receive the recognizer finishes processing the speech and send a RECOGNITION signal to the server dispatcher and the text 64. The server send the text to the client dispatcher and client application 66 for display to the user. The system is ready for the next BEGIN/RECOGNITION signal.

For development and troubleshooting purpose the system may include an application program means resident at the server to display the text. In addition there may be designed within the dispatcher means to detect communication breakdowns wherein the typical response is for the dispatcher to close down all hardware and software components controlled by the dispatchers.

A message packet is herein defined as a quantized digitized features from the start of an utterance to an end-of-speech pause or another such logical unit. The packets can be forwarded by the client dispatcher to the server at a metered rate. This is accomplished by the server dispatcher return a SET RECEIVED signal whenever a set of packets has been received, as may be defined by the server system design. The dispatcher in response to this returned signal can forward packets at a rate corresponding to the real time latency of the connection to substantially guarantee that the number of in-transit packets can be limited to a constant size.

As discussed earlier, the speech processor module need not be a speech recognizer, but can be a speaker verifier or speaker identifier or the like. If a speaker verification, the output of this module would be a determination sent back to the client that the speech came from the person that the user claims to be. In this case the user would input a sample speech that is later matched by the verification module. A speaker identification module could also be used. In this case a number of speakers would be enrolled and each would give a sampling of their voice. Later an unknown voice would be compared and the verification process would, in the simplest process would return a report of the previously enrolled person with the highest likelihood of being the speaker. Another result might be that it was most likely that no enrolled person was speaking. In the verification and identification applications the features from the front end may be different that in the speech recognizer case. The new features, if any, are documented in the above referenced documents.

As discussed above there may be control information passed between the client and server. In a preferred embodiment a string of keyword-value pairs is attached as a header to the speech data sent. The keywords and the values are arbitrary tokens that are meaningful to both the client and the server application programs. The keywords are token/names/attribute specific and meaningful to the particular application being used. In a preferred embodiment the keyword may be the state variables of the particular application.

When the client is sending to the server, the keyword-value sequence allows the client program to directly affect the operation of the speech processor and server application program. The client may specify what grammar the speech processor should use to recognize the current speech input or provide extra arguments over and above the speech inputs.

When the server is sending to the client, the keyword-value sequence allows the server application program to return a response to the user's speech input. The client program can then use the keyword-value pairs to determine what action it should perform, which could be for instance to display the transcribed speech to the user or to fill in a form displayed to the user with values the server has computed from the speech input.

Figure 4:
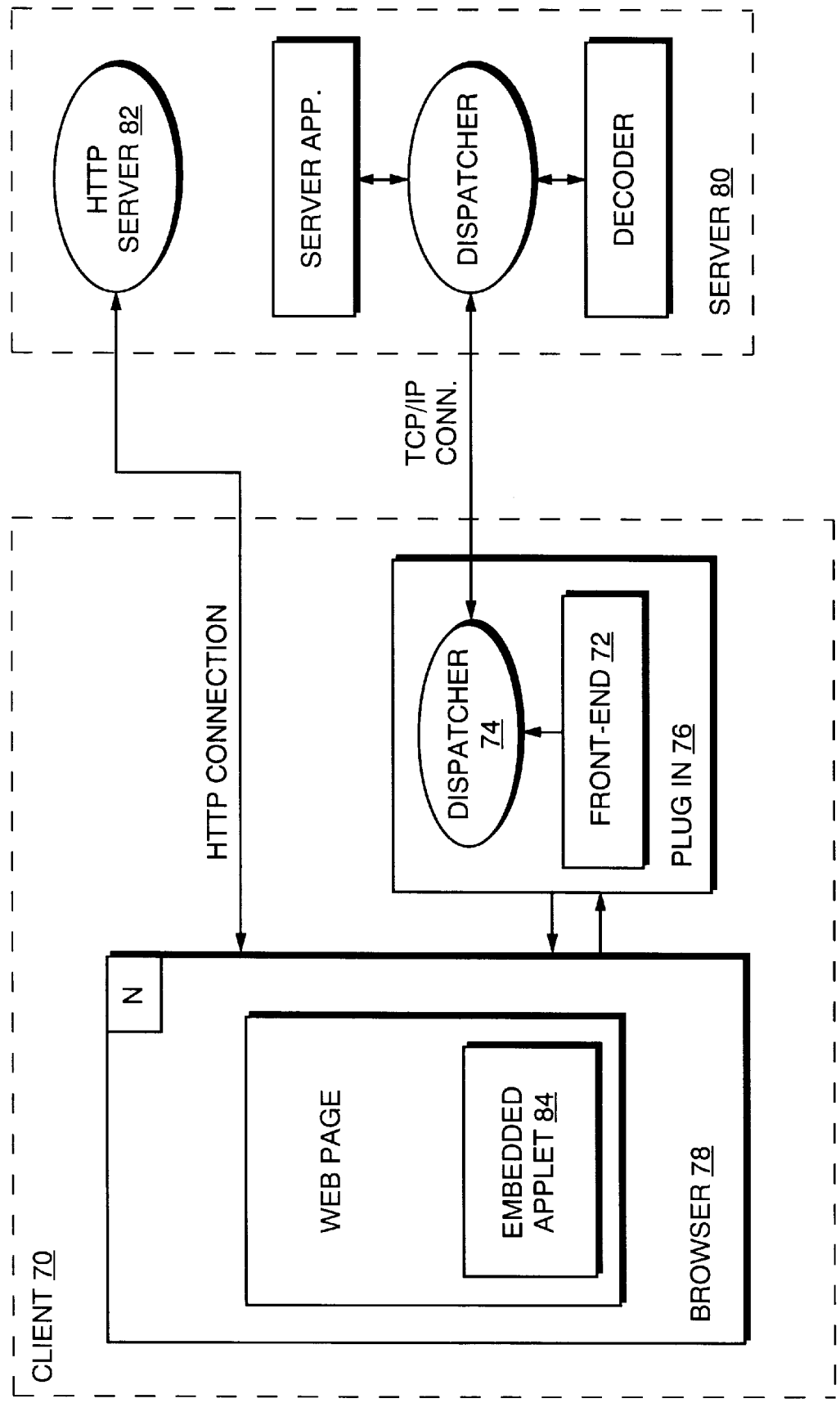
FIG. 4 is a functional block diagram of a world-wide-web browser.

FIG. 4 diagrams the present invention incorporated in a World-Wide-Web (WWW) browser, such as NETSCAPE NAVIGATOR®, into the client side 70 application. The front end 72 and the dispatcher 74 are combined into a single plug-in module 76 which augments the browser 78. The plug-in 76 is connected to the server side 80. The server side 80 is the same as in FIGS. 1–3, except an HTTP server capability for providing Web page in HTML. HTTP refers to hyper-text transfer protocol, and HTML refers to hypertext mark-up language. The HTTP server may be located external to the server 80 in other preferred embodiments.

The browser 78 down loads a specially designated Web page that is speech enabled by the incorporation of an application dependent program referred to as an embedded applet 84. The applet may be programmed in the Java language or any other suitable language. The applet provide a graphical user interface (GUI) for control and data display, which can be embedded in the Web page itself or resident in a pop-up window external to the browser in another preferred embodiment. The GUI may include an element such as a LISTEN button to start the speech processing as described above. There may be slots for display of text information, such as English transcriptions resulting form the speech processing. The applet controls the plug-in through various interfaces function, for example the applet may command the plug-in to begin the speech processing as well as passing keyword-value pairs for control information to accompany the speech processing.

Figure 5:
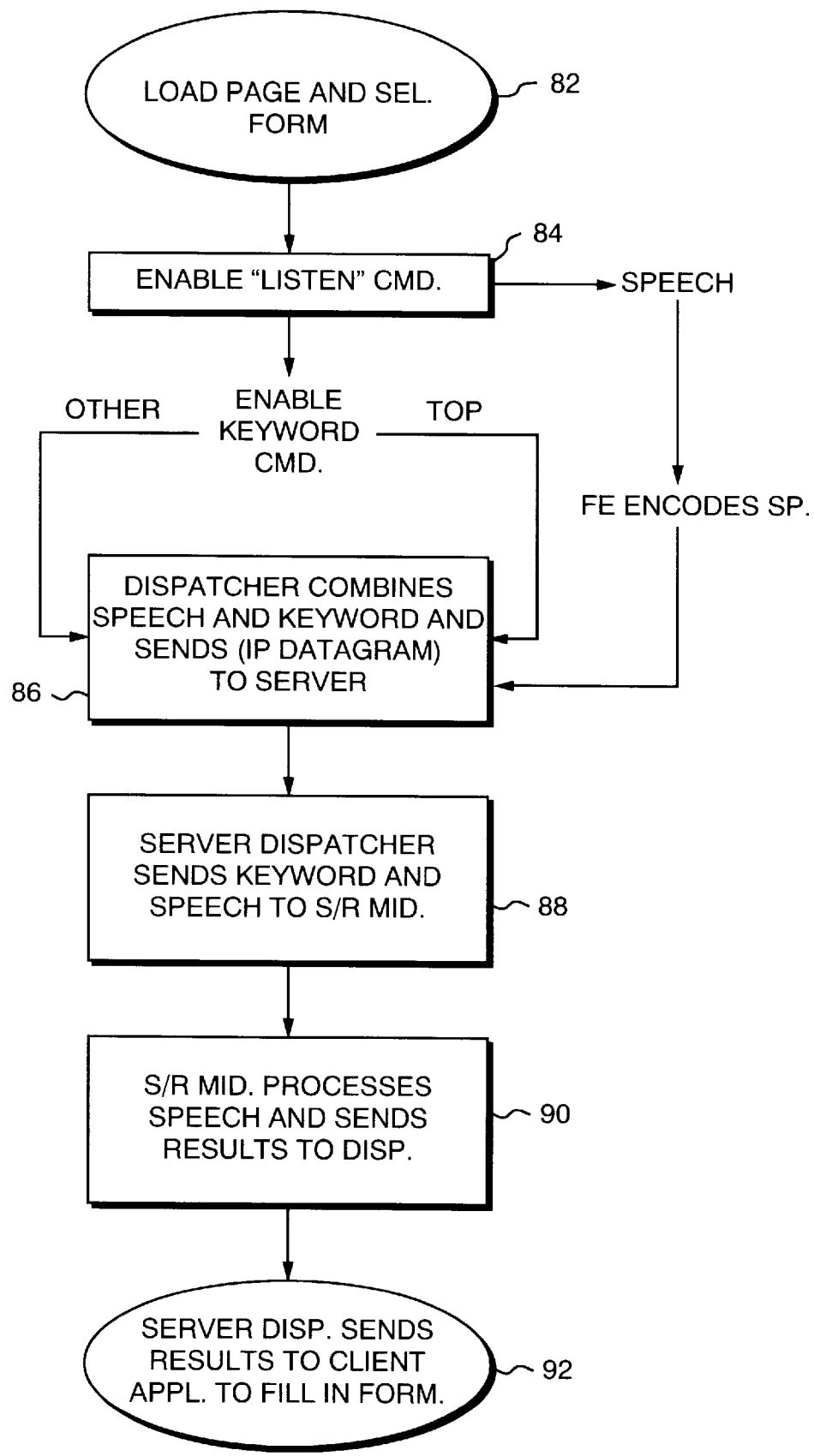
FIG. 5 is a functional flow chart of one specific application other than speech recognition.

The combination of page-embedded client software, remote speech processing, and communication of control information between client and server allows a variety of speech applications to be performed over the Internet or other such network. One class of applications are form-filling applications in which the user interface applet visually displays a form with various fields for filling in. The form will be filled in by speech processing. For example, with reference to FIG. 5, an airline reservation/ticketing form is described with paired LISTEN buttons and slots for ORIGIN, DESTINATION, DATE, and TOP. The form is downloaded 82, the LISTEN button is clicked on 84, The user clicks on ORIGIN and says "Boston", and the client application will send the server the quantized speech features plus a control header message 86, The server speech recognizer will receive the quantized features 88 and sends back 90 to the server, and then to the client where the word Boston filled in on the form area marked ORIGIN.

The TOP button would be used for a natural language processing as follows: The user clicks on LISTEN, and TOP and say, "I want to fly from Boston to Denver tomorrow." The server would recognize and interpret the speech and return:

TOP: "I want to fly from Boston to Denver tomorrow."
ORIGIN: Boston
DEST: Denver
DATE: Feb. 5, 1997.

The entire form of multiple fields may be filled in this manner. Pre-recorded questions may be issued to the user when insufficient information is input. Other forms, such as reservation system forms, are known in the art and handled in a similar fashion as just described.

Figure 6:
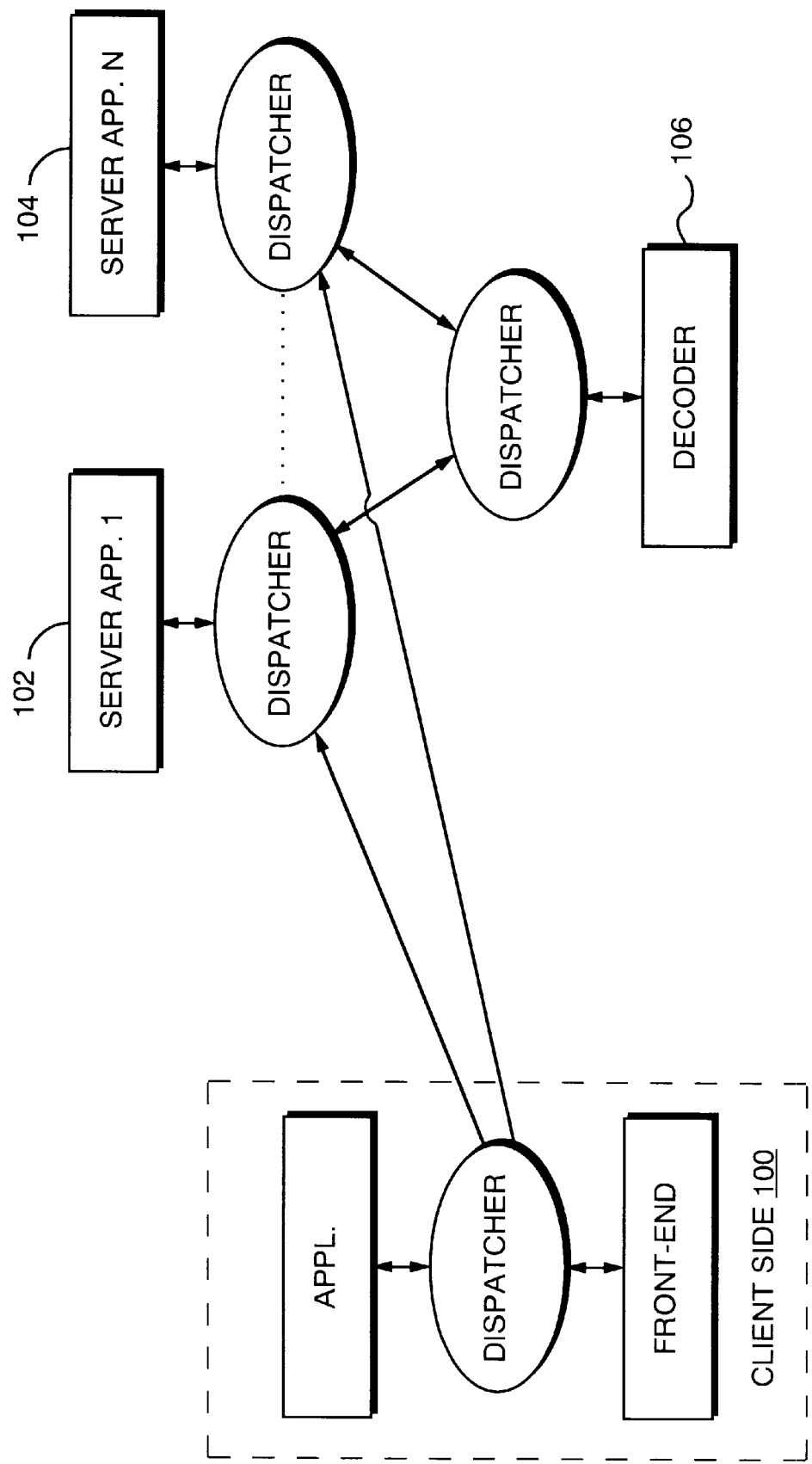
FIG. 6 is an extended architecture system incorporating the present invention.

FIG. 6 shows an extended more general architecture utilizing the present invention. The client site 100 is the same as before, but the server sites 102 and 104 do not have the speech recognition program at the server sites. Instead the speech recognition resides at another site 106, which may serve a multitude of servers. More complex and more general configuration may be made wherein the various functions may all be distributed over a network. In the network of FIG. 6 there is direct communication between the various dispatchers at each site, and the interactions of these modules is similar to that described above for a single client server.

One particular advantage of the system of FIG. 6 is the efficiency when speaker verification/identification is required. In such an instance, many clients may share the speech verifier/identifier at one site.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. In a client server architecture, a method of speech or voice utterances processing comprising the steps of:

inputting into and digitizing voiced utterances by the client portion of the client server architecture as the utterances occur, extracting and quantizing features from said digitized voice utterances within said client computer system, organizing said extracted and quantized features into a protocol for sending, sending said quantized features to a server computing system, recognizing and decoding said quantized features into a response, and sending said response back to said client computing system, wherein said response is received as the voiced utterances occur in real time.

2. The method of claim 1, wherein said server includes a speech processing program, further comprising the steps of:

establishing communications between the client and the server, sending said quantized features from the client to the server, buffering said quantized features at the server until the speech processing program is ready to accept said quantized features.

3. The method of claim 1 wherein said response is the most likely text of said utterance.

4. The method of claim 1 wherein said response is an identification and verification of a speaker.

5. The method of claim 1 wherein said step of organizing includes incorporating control information.

6. The method of claim 1 wherein said speech processing is accomplished over transmission channels with a bandwidth of less than 16,000 bits/per/second.

7. The method of claim 1 further comprising the steps of:

providing a speech processing applet, controlling said speech processing with said applet, providing a program for browsing the Internet, down loading a page, containing said applet, with said browser program, accepting speech associated with said page, processing said speech at said server and returning to said client said results of said processing.

8. The method as defined in claim 1 further comprising the step of displaying said received response as a filled in form.

9. Client/Server apparatus for processing voice utterances comprising:

means for inputting into and for digitizing voiced utterances by the client portion of the client server apparatus as the utterances occur, means for extracting and for quantizing features from said digitized voice utterances, means for organizing said extracted and quantized features into a protocol for sending, means for sending said quantized features to the server portion of the client server apparatus, means for recognizing and for decoding said quantized features into a response, and means for sending said response back to said client portion of the client server apparatus, wherein said response is received as the voiced utterances occur in real time.

10. The apparatus as defined in claim 9 further comprising:

means for establishing communications between the client and the server, means for sending said for quantized features from the client to the server, and means for buffering said quantized features at the server until the speech processing program is ready to accept said quantized features.

11. The apparatus as defined in claim 9 wherein said response is the most likely text of said utterance.

12. The apparatus as defined in claim 9 wherein said response is an identification and verification of a speaker.

13. The apparatus as defined in claim 9 wherein said means for organizing comprises means for incorporating control information.

14. The apparatus as defined in claim 9 wherein said speech processing is accomplished over transmission channels comprising a bandwidth of less than 16,000 bits/per/second.

15. The apparatus as defined in claim 9 further comprising:

a speech processing applet for controlling the client portion of said speech processing, a browser program for the Internet, means for down loading a page, containing said applet, with said browser program, means for accepting speech associated with said page, and means for processing said speech at said server portion and returning to said client portion said results of said processing.

16. The apparatus as defined in claim 9 further comprising means for displaying the received response as a filled in form.

* * * * *